(12) United States Patent
Binder

(10) Patent No.: US 12,283,707 B2
(45) Date of Patent: Apr. 22, 2025

(54) BATTERY CELL STACK SPACER

(71) Applicant: Samsung SDI Co., Ltd., Yongin-si (KR)

(72) Inventor: Daniel Binder, Leibnitz (AT)

(73) Assignee: Samsung SDI Co., Ltd., Yongin-si (KR)

( * ) Notice: Subject to any disclaimer, the term of this patent is extended or adjusted under 35 U.S.C. 154(b) by 773 days.

(21) Appl. No.: 17/450,052

(22) Filed: Oct. 5, 2021

(65) Prior Publication Data

US 2022/0115733 A1 Apr. 14, 2022

(30) Foreign Application Priority Data

Oct. 9, 2020 (EP) ..................................... 20200922
Oct. 1, 2021 (KR) ......................... 10-2021-0130777

(51) Int. Cl.
| | |
|---|---|
| *H01M 50/289* | (2021.01) |
| *H01M 10/653* | (2014.01) |
| *H01M 10/6555* | (2014.01) |
| *H01M 10/658* | (2014.01) |
| *H01M 50/103* | (2021.01) |
| *H01M 50/209* | (2021.01) |

(52) U.S. Cl.
CPC ....... *H01M 50/289* (2021.01); *H01M 10/653* (2015.04); *H01M 10/6555* (2015.04); *H01M 10/658* (2015.04); *H01M 50/103* (2021.01); *H01M 50/209* (2021.01); *H01M 2220/20* (2013.01)

(58) Field of Classification Search
CPC ........... H01M 50/289; H01M 10/6555; H01M 10/653; H01M 10/658; H01M 50/209; H01M 50/103; H01M 2220/20
See application file for complete search history.

(56) References Cited

U.S. PATENT DOCUMENTS

| | | | |
|---|---|---|---|
| 2008/0292950 A1 | 11/2008 | Maeda et al. | |
| 2012/0171554 A1* | 7/2012 | Kim | ................. H01M 10/6551 429/158 |
| 2015/0064542 A1 | 3/2015 | Noh et al. | |

(Continued)

FOREIGN PATENT DOCUMENTS

| | | |
|---|---|---|
| CN | 106025321 A | 10/2016 |
| CN | 107078311 A | 8/2017 |

(Continued)

OTHER PUBLICATIONS

European Office Action issued in corresponding Patent Application No. EP 20 200 922.1, dated Nov. 21, 2023, 5 pages.

(Continued)

*Primary Examiner* — Basia A Ridley
*Assistant Examiner* — Heng M. Chan
(74) *Attorney, Agent, or Firm* — Lewis Roca Rothgerber Christie LLP

(57) ABSTRACT

In a battery cell stack spacer compensating a thickness deviation of a stack of battery cells, the battery cell stack spacer includes: a first carrier member providing planar support to a base side of a battery cell; a second carrier member providing planar support to a base side of a further battery cell; one or more tolerance compensation sheets sandwiched between the first carrier member and the second carrier member.

14 Claims, 5 Drawing Sheets

(56) References Cited

U.S. PATENT DOCUMENTS

| | | | |
|---|---|---|---|
| 2016/0093849 A1 | 3/2016 | DeKeuster et al. | |
| 2016/0285124 A1 * | 9/2016 | Martinchek et al. | |
| 2019/0006642 A1 * | 1/2019 | Sakaguchi | H01M 50/204 |
| 2020/0106065 A1 * | 4/2020 | Ito | H01M 50/229 |
| 2021/0013478 A1 | 1/2021 | Sasaki et al. | |

FOREIGN PATENT DOCUMENTS

| | | | |
|---|---|---|---|
| DE | 10 2011 103 965 A1 | 12/2012 | |
| DE | 102012101141 A1 * | 8/2013 | H01M 10/613 |
| EP | 2 843 725 A1 | 3/2015 | |
| EP | 3 201 971 B1 | 8/2017 | |
| EP | 3 588 610 A1 | 1/2020 | |
| WO | WO 2019/181501 | 9/2019 | |

OTHER PUBLICATIONS

Chinese First Office Action issued in corresponding Patent Application No. CN 202111174592.5, mailed Dec. 29, 2023, 17 pages with English Translation.

Extended European Search Report for corresponding EP 20200922.1, dated Mar. 15, 2021, 8pp.

\* cited by examiner

BATTERY CELL STACK SPACER

CROSS-REFERENCE TO RELATED APPLICATION

The present application claims priority to and the benefit of European Patent Application No. 20200922.1, filed in the European Patent Office on Oct. 9, 2020, and Korean Patent Application No. 10-2021-0130777, filed in the Korean Intellectual Property Office on Oct. 1, 2021, the entire content of which is incorporated herein by reference.

BACKGROUND

1. Field

Aspects of some embodiments of the present invention relate to a battery cell stack spacer.

2. Description of Related Art

In the recent years, vehicles for transportation of goods and peoples have been developed using electric power as a power source for motion. Such an electric vehicle is an automobile that is propelled by an electric motor, using energy stored in rechargeable batteries. An electric vehicle may be solely powered by batteries or may be a form of hybrid vehicle additionally powered by, for example, a gasoline generator. Furthermore, the vehicle may include a combination of electric motors and combustion engines.

In general, an electric-vehicle battery (EVB) or traction battery is a battery used to power the propulsion of battery electric vehicles (BEVs). Electric-vehicle batteries differ from starting, lighting, and ignition batteries because they are generally designed to give power over sustained periods of time. A rechargeable or secondary battery differs from a primary battery in that it can be repeatedly charged and discharged, while the latter provides only an irreversible conversion of chemical to electrical energy. Low-capacity rechargeable batteries may be used as a power supply for small electronic devices, such as cellular phones, notebook computers and camcorders, while high-capacity rechargeable batteries may be used as the power supply for hybrid vehicles and the like.

The above information disclosed in this Background section is only for enhancement of understanding of the background and therefore the information discussed in this Background section does not necessarily constitute prior art.

SUMMARY

Aspects of some embodiments of the present invention relate to a battery cell stack spacer for compensating a thickness deviation of a stack of battery cells from a predefined set-value for the thickness. Embodiments of the battery cell stack spacer may further comprise thermally insulating layers. The present invention further relates to a method of assembling a battery cell stack comprising a plurality of battery cells and a battery cell stack spacer according to the invention. Still, the invention relates to a battery comprising a battery cell stack, wherein the battery cell stack comprises a plurality of battery cells and a battery cell stack spacer according to the invention. Also, the invention relates to a vehicle comprising a battery with a battery cell stack and the battery cell stack spacer according to the invention.

According to some embodiments of the present invention, a battery cell stack spacer may compensate a thickness deviation of a stack of battery cells. The battery cell stack spacer comprises: a first carrier member for providing planar support to a base side of a battery cell; a second carrier member for providing planar support to a base side of a further battery cell; one or more tolerance compensation sheets sandwiched between the first carrier member and the second carrier member.

Thus, according to some embodiments, only one battery cell stack spacer is stacked between the cells of the battery cell stack, wherein the thickness of the cell stack spacer may be determined such that thickness tolerances of the battery cells are compensated. The thickness of the battery cell stack spacer may be adjusted by the thickness or number of the at least one tolerance compensation sheet.

A battery cell may have the shape of a right prism, i.e., it may have a body having two parallel (planar) base faces and a number of side faces joining corresponding edges of the base faces, wherein all side faces extend perpendicular to base faces. Above and in the following, the term "base side" of a prismatic battery cell shall refer to a base face of the prismatic battery cell. Further, the term "thickness" with regard to a prismatic battery cell shall refer to the distance between the base faces. A prismatic battery cell may have a rectangular base face, and the distance between the base faces is smaller than each of the edges of the base faces; in other words, if the edges of each of the rectangular base faces have the lengths a and b, the relations a>c and b>c hold, with c denoting the distance between the base faces. However, here and in the following, the term "prismatic" is to be understood in a rather general fashion, such that the term "prismatic" may also applied to geometrical bodies having base faces with a round edge (e. g., a circled edge; in this case, the prismatic cell would be of cylindrical shape) or with at least a part of the edges being round. In the following, the term "battery cell" shall refer to a prismatic battery cell.

According to some embodiments, the first and/or the second carrier member may be manufactured by injection molding.

According to some embodiments, tolerance compensation sheets may be available in different strengths (thicknesses) to compensate the tolerance of an overall thickness (length) of a stack of battery cells.

According to some embodiments, a side of a carrier member suitable for providing support to a base side of a battery cell may be essentially congruent to the base side of the battery cell. Further, another side of the carrier member facing a compensation sheet may be congruent to the compensation sheet. In case of more than one compensation sheet, the sides of each of the compensation sheets may be congruent to each other. The term "thickness" with regard to a compensation sheet shall refer to the distance between the extended sides of the compensation sheet.

According to some embodiments, by adapting (choosing) the thickness of the tolerance compensation sheet (if only a single compensation sheet is sandwiched between the two carrier members) or by adapting (choosing) the accumulated thickness of two or more compensation sheets (i.e., the result of adding the thicknesses of each of the compensation sheets sandwiched between the carrier members), the total thickness of the battery cell stack spacer is adjustable, and in particular adjustable to a predefined thickness value. In the following, the "tolerance compensation sheet(s)" may be simply referred to by the term "compensation sheet(s)".

According to some embodiments, the first carrier member and/or the second carrier member may be manufactured by injection molding.

According to some embodiments of the battery cell stack spacer, at least one of the one or more tolerance compensation sheets exhibits a lower rigidity in comparison to the material of each of the first and second carrier member.

According to some embodiments, in case of a swelling or contraction of the battery cells in the battery stack and, in consequence thereof, the rising or decreasing pressure onto the cell stack spacer according to the invention, the one or more tolerance compensation sheets may change adapt their thickness and thus balance the swelling or contraction of the batteries cells in the battery stack. One or more of the tolerance compensation sheets may made of an elastic material.

According to some embodiments, in the battery cell stack spacer, at least one of the one or more tolerance compensation sheets is made of or comprises polyethylene terephthalate (PET).

According to some embodiments, in the battery cell stack spacer, the side of the first carrier member facing the one or more tolerance compensation sheets, the sides of each of the one or more tolerance compensation sheets, and the side of the second carrier member facing the one or more tolerance compensation sheets are congruent to each other and are assembled form-fitting in the battery cell stack.

According to some embodiments, in the battery cell stack spacer, the one or more tolerance compensation sheets each comprise one or more holes. The first carrier member comprises one or more bolts, bosses, or projections. These bolts, bosses, or projections (in the following, only the term "bolt"/"bolts" will be used for simplification) are arranged such on the first carrier member that each bolt projecting from the first carrier member penetrates, for each of the one or more tolerance compensation sheets, through one of the holes in the one or more tolerance compensation sheets.

According to some embodiments, the one or more compensation sheets are thus held by the one or more bolts arranged on the first carrier member. In particular, the one or more bolts may prohibit a slippage of the tolerance compensation sheets between the carrier members.

According to some embodiments, each bolt arranged on the first carrier member may penetrate through a hole of each of the compensation sheets, but that not necessarily each hole of a compensation sheet is penetrated by a bolt arranged on the first carrier member. In other words, for each compensation sheet, the number of holes in the compensation sheet may be larger than the number of bolts arranged on the first carrier member.

According to some embodiments, the number of bolts arranged on the first carrier member corresponds to the number of holes provided in each of the compensation sheets.

According to some embodiments, at least some of the bolts arranged on the first carrier member may have a tapered shape, i.e., a shape that tapers in the direction towards the respective opposite carrier member.

According to some embodiments, in the battery cell stack spacer, the second carrier member comprises one or more bolts, the bolts being arranged such on the second carrier member that each bolt projecting from the second carrier member penetrates, for each of the one or more tolerance compensation sheets, through one of the holes in the one or more tolerance compensation sheets.

According to some embodiments, each bolt arranged on the first carrier member or the second carrier member penetrates through a hole of each of the compensation sheets, but that not necessarily each hole of a compensation sheet is penetrated by a bolt arranged on the first or second carrier member. In other words, for each compensation sheet, the number of holes in the compensation sheet may be larger than the number of bolts arranged on the first and second carrier member.

According to some embodiments, the number of bolts arranged on the first and second carrier member corresponds to the number of holes provided in each of the compensation sheets.

According to some embodiments, at least some of the bolts arranged on the second carrier member may have a tapered shape, i.e., a shape that tapers in the direction towards the respective opposite carrier member.

According to some embodiments, in the battery cell stack spacer, for each bolt arranged on the first carrier member or the second carrier member, a recess or depression is formed in the respective opposite carrier member at a position opposite to the bolt.

According to some embodiments, each of the bolts, while reaching through a hole in the one or more compensation sheets, may engage with the recesses or depression. According to some embodiments, the one or more compensation sheets may be prevented from slipping through possible gaps between the bolts of one carrier member and the side of the opposite carrier member facing the one or more compensation sheets.

According to some embodiments, an opening can be formed within the respective opposite carrier member instead of a recess or depression.

According to some embodiments, in the battery cell stack spacer, each of the one or more tolerance compensation sheets has a rectangular shape. Each of the tolerance compensation sheets has four holes, each of the holes being placed in a corner of the respective tolerance compensation sheet. Each of the bolts and/or each of the recesses or depressions is arranged on the respective carrier member at a position corresponding to one of the four holes of the tolerance compensation sheets being sandwiched between the first and second carrier member.

According to some embodiments, the one or more compensation sheets may not be wrinkled or folded when being sandwiched between the two carrier members.

According to some embodiments, there is given one predefined distance, and each of the four holes in the corners of each of the compensation sheets are arranged in the predefined distance to each of the two adjacent edges of the respective compensation sheet. This has the advantage that, due to the symmetries of each of the compensation sheet, there four ways to arrange each of the compensation sheets between the carrier members.

According to some embodiments, the battery cell stack spacer further comprises a first thermally insulating layer on the side of the first carrier member opposite to the at least one tolerance compensation sheet.

According to some embodiments, the battery cell stack spacer still provides a thermal barrier and additionally compensates manufacturing thickness tolerances of the battery cells instead of cell swelling.

According to some embodiments, the battery cell stack spacer further comprises a second thermally insulating layer on a side of the second carrier member opposite to the at least one tolerance compensation sheet.

According to some embodiments, which include a first and a second thermally insulating layer, the two carrier members as well as the tolerance compensation sheets provide for a distance between the two thermally insulating layers, which thus further reduces the heat conductivity between the battery cells adjacent to the battery cell stack spacer (i.e., of battery cells, between which the battery cell stack spacer is sandwiched).

According to some embodiments, in the battery cell stack spacer, for at least one of the thermally insulating layers, the material of the thermally insulating layer exhibits a lower heat conductivity and/or a higher temperature resistance in comparison to the material of the carrier member the respective insulating member is on.

According to some embodiments, in the battery cell stack spacer, wherein for at least one of the thermally insulating layers, the material of the thermally insulating layer is an electrical isolator.

According to some embodiments, at least one of the thermally insulating layers may be an inorganic paper or may comprise an inorganic paper. According to some embodiments, at least one of the thermally insulating layers may comprise aramid. According to some embodiments, at least one of the thermally insulating layers may comprise ceramics. According to some embodiments, at least one of the thermally insulating layers may comprise a composite of aramid and ceramics.

According to some embodiments, a thermally insulating layer may be glued on the carrier member, on which the thermally insulating layer is located. In some embodiments, the glue is provided in area adjacent to the edges of the thermally insulating layer, and in a center area of the thermally insulating layer, no glue is provided. According to some embodiments, the glue is provided on a flat support member, wherein glue is provided on both sides of the support member.

Some embodiments may include a battery comprising a battery cell stack, wherein the battery cell stack comprises a plurality of battery cells and at least one battery cell stack spacer.

Some embodiments may include a vehicle comprising a battery.

According to some embodiments, in a method of assembling a battery cell stack comprising a plurality of battery cells and a battery cell stack spacer according to the invention, the method includes: determining the thickness deviation of the battery cell stack from a predefined set-value, the predefined set-value being larger than the thickness of the battery cell stack; selecting or assembling the cell stack spacer such that the thickness of the battery cell stack spacer corresponds to the thickness deviation determined in step a); selecting a first sub-stack of aligned battery cells and a second sub-stack of aligned battery cells, the first set either comprising zero battery cells, or comprising, counted from one end of the battery cell stack, only the first battery cell or each battery cell from the first battery cell to a further battery cell behind the first battery cell, and the second sub-stack comprising each of the remaining battery cells; inserting the battery cell stack spacer between the first sub-stack of aligned battery cells and the second sub-stack of aligned battery cells.

According to some embodiments, the number of the remaining battery cells constituting the first sub-stack may be zero, i.e., the first sub-stack may contain no battery cell at all (in this case, the first sub-stack is the empty set). In this case, the battery cell stack spacer acts as a mere spacer, as it provides no thermal isolation between sets of battery cells.

According to some embodiments, the predefined set-value may, of course, correspond to the inner thickness (or length) of a case provided for accommodating the battery cell stack.

According to some embodiments, the thickness of a battery cell stack corresponds to the accumulated thickness of the battery cells in the stack, the thickness of a battery cell being defined as described above. In other words, the thickness of a battery cell stack corresponds to the result of the addition of the thicknesses of each battery cell comprised in the battery cell stack. Then, the thickness deviation of the battery cell stack from a predefined (thickness) set-value is the (absolute value) of a difference between the predefined set-value and the thickness of the battery cell stack.

According to some embodiments, the method may further include aligning all battery cells to a stack without interruption such that, starting with a first battery, any subsequent battery abuts, with one of its base sides, the respective foregoing battery in the stack, and measuring the length of the stack in the direction of the aligning of the battery cells.

According to some embodiments, the method may further include measuring the thickness of each of the battery cells to be stacked, and adding up each of the measured battery cell thicknesses.

According to some embodiments, the measuring of the thickness of the battery cell stack or of the thickness of the individual battery cells may be performed at a predefined reference temperature, e. g., at room temperature (such as 16° C., 17° C., 18° C., 19° C., 20° C., 21° C., or 22° C.). Also, the measuring of the thickness may be performed at a predefined reference load or at a predefined reference charging voltage.

According to some embodiments, the method further includes choosing, out of a set of battery cells spacers having different thicknesses, a battery cell spacer having a thickness corresponding to the thickness deviation.

According to some embodiments, the method further includes choosing one or more tolerance compensation sheets such that after implementing each of these tolerance compensation sheets into the battery cell spacer, the thickness of the assembled battery cell spacer corresponds to the thickness deviation.

Designs of battery cell stack spacers may utilize various combs with crossing ribs. The combination of swelling forces and higher temperatures during a thermal runaway may influence or effect the structure of the frame. Swelling and thermal runaway tests may therefore be useful to ensure performance. Material properties of the cell stack spacers may include, for example, the following values (or approximate values: Breakdown Voltage: >2.7 kV; Temperature Range: −40° to +80° C.; Short term temperature resistance: 190° C. (30 seconds); Swelling force 20 kN.

As can be taken from the above, the following technical characteristics or properties may be considered in at least some of the embodiments of the present invention: compensation of the tolerance of a battery cell stack; reducing of the swelling force; thermal and/or electrical isolation between the battery cell sub-stacks separated by the battery cell stack spacer; increase time during the propagation of a thermal runaway between two separated battery cell sub-stacks; and connection surface of various electrical components.

The battery cell stack spacer according to some embodiments of the present invention may compensate all tolerances of the battery cell stack components. Further, some embodiments of the battery cell stack spacer may be suitable to protect two battery cell sub-stacks during the thermal runaway, and thus may increase the safety of users or passengers.

Further aspects of some embodiments according to the present invention could be learned from the following description and the appended claims.

BRIEF DESCRIPTION OF THE DRAWINGS

Features will become apparent to those of ordinary skill in the art by describing in more detail aspects of some example embodiments with reference to the attached drawings in which.

DETAILED DESCRIPTION

Figure 1:
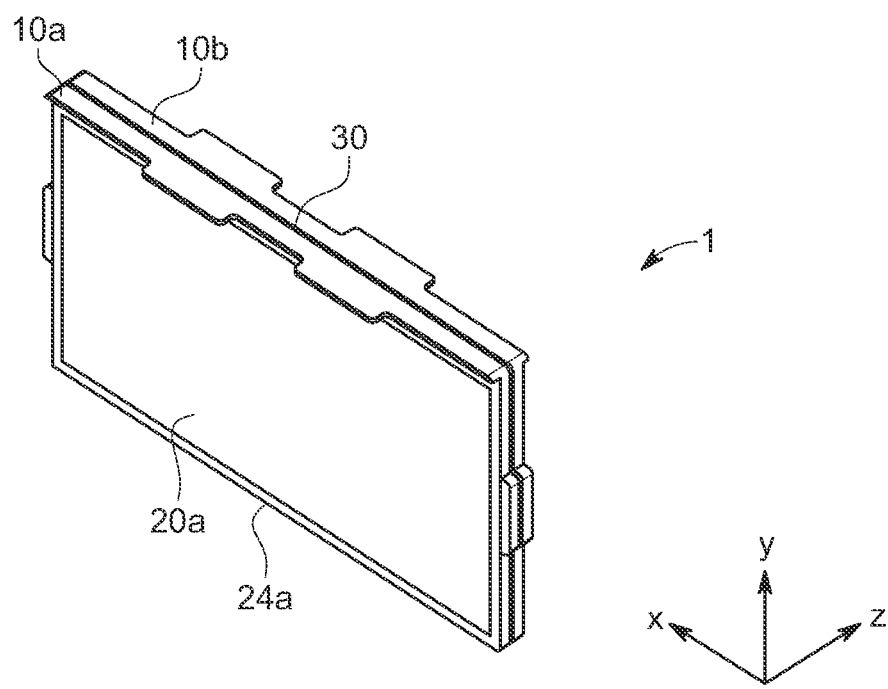
FIG. 1 illustrates a schematic perspective view of a battery cell stack spacer according to one embodiment of the invention in an assembled state.

Reference will now be made in detail to embodiments, examples of which are illustrated in the accompanying drawings. Effects and features of some of the embodiments, and implementation methods thereof will be described with reference to the accompanying drawings. In the drawings, like reference numerals denote like elements, and redundant descriptions are omitted. As used herein, the term "and/or" includes any and all combinations of one or more of the associated listed items. Further, the use of "may" when describing embodiments of the present invention refers to "one or more embodiments of the present invention."

It will be understood that although the terms "first" and "second" are used to describe various elements, these elements should not be limited by these terms. These terms are only used to distinguish one element from another element. For example, a first element may be named a second element and, similarly, a second element may be named a first element, without departing from the scope of the present invention.

In the following description of embodiments of the present invention, the terms of a singular form may include plural forms unless the context clearly indicates otherwise.

It will be further understood that the terms "include," "comprise," "including," or "comprising" specify a property, a region, a fixed number, a step, a process, an element, a component, and a combination thereof but do not exclude other properties, regions, fixed numbers, steps, processes, elements, components, and combinations thereof.

It will also be understood that when a film, a region, or an element is referred to as being "above" or "on" another film, region, or element, it can be directly on the other film, region, or element, or intervening films, regions, or elements may also be present.

Features of the inventive concept and methods of accomplishing the same may be understood more readily by reference to the following detailed description of embodiments and the accompanying drawings. Hereinafter, example embodiments will be described in more detail with reference to the accompanying drawings, in which like reference numbers refer to like elements throughout. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description, and thus, descriptions thereof will not be repeated. In the drawings, the relative sizes of elements, layers, and regions may be exaggerated for clarity.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e. g., rotated 90 degrees or at other orientations) and the spatially relative descriptors used herein should be interpreted accordingly.

Some of the figures are described with the help of a cartesian coordinate system. Therein, the terms "upper" and "lower" are defined according to the y-axis. For example, an upper cover is positioned at the upper part of the y-axis, whereas a lower cover is positioned at the lower part thereof. In the drawings, the sizes of elements may be exaggerated for clarity. For example, in the drawings, the size or thickness of each element may be arbitrarily shown for illustrative purposes, and thus the embodiments of the present invention should not be construed as being limited thereto.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the present invention. As used herein, the singular forms "a," "an," and "the" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent deviations in measured or calculated values that would be recognized by those of ordinary skill in the art. Further, if the term "substantially" is used in combination with a feature that could be expressed using a numeric value, the term "substantially" denotes a range of +/−5% of the value centered on the value. Further, the use of "may" when describing embodiments of the present invention refers to "one or more embodiments of the present invention."

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

In general, rechargeable batteries include an electrode assembly including a positive electrode, a negative electrode, and a separator interposed between the positive and negative electrodes, a case receiving or housing the electrode assembly, and an electrode terminal electrically connected to the electrode assembly. An electrolyte solution may be injected into the case in order to enable charging and discharging of the battery via an electrochemical reaction of the positive electrode, the negative electrode, and the electrolyte solution. The shape of the case, for example, cylindrical or prismatic, depends on the intended purpose, application, or use of the battery. Lithium-ion (and similar lithium polymer) batteries, for example, may be utilized in laptops and other consumer electronics, but may also be utilized in electric vehicles.

Rechargeable batteries may be used as a battery module formed of a plurality of unit battery cells coupled in series and/or in parallel so as to provide a relatively high energy density, for example, for driving a motor of a hybrid or fully electric vehicle. That is, the battery module may be formed by interconnecting the electrode terminals of the plurality of unit battery cells depending on a required amount of power and in order to realize a relatively high-power rechargeable battery.

A battery pack is a set of any number of (for example, identical or similar) battery modules. They may be configured in a series, parallel or a mixture of both to deliver the desired voltage, capacity, or power density. Components of battery packs include the individual battery modules, and the interconnects, which provide electrical conductivity between them.

The mechanical integration of such a battery pack requires appropriate mechanical connections between the individual components, for example, of battery modules, and between them and a supporting structure of the vehicle. These connections must remain functional and safe during the average service life of the battery system. Further, installation space and interchangeability may be desirable characteristics, especially in mobile applications.

Mechanical integration of battery modules may be achieved by providing a carrier framework and by positioning the battery modules thereon. Fixing the battery cells or battery modules may be achieved by fitted depressions in the framework or by mechanical interconnectors such as bolts or screws. Alternatively, the battery modules may be confined by fastening side plates to lateral sides of the carrier framework. Further, cover plates may be fixed atop and below the battery modules.

The carrier framework of the battery pack may be mounted to a carrying structure of the vehicle. In case the battery pack is fixed at the bottom of the vehicle, the mechanical connection may be established from the bottom side by for example bolts passing through the carrier framework of the battery pack. The framework may be made, for example, of aluminum or an aluminum alloy to lower the total weight of the construction.

Battery systems, despite any modular structure, may include a battery housing that serves as an enclosure to seal the battery system against the environment and to provide structural protection of the battery system's components.

To provide thermal control of the battery pack, an active or passive thermal management system may be utilized to safely use the at least one battery module by efficiently emitting, discharging and/or dissipating heat generated from its rechargeable batteries. If the heat emission/discharge/dissipation is not sufficiently performed, temperature deviations may occur between respective battery cells, such that the at least one battery module cannot generate a desired amount of power. In addition, an increase of the internal temperature can lead to abnormal reactions occurring therein and thus charging and discharging performance of the rechargeable deteriorates and the life-span of the rechargeable battery is shortened. Thus, cell cooling for effectively emitting/discharging/dissipating heat from the cells may be performed.

In some systems, battery cells may be stacked to form modules, while the cell stacks may have relatively fewer battery cells. Thus, it may be possible to compensate thickness tolerances of the battery cell housings by an elasticity of a frame surrounding the stack. Spacer frames may be alternately stacked with the battery cells to allow cell swelling.

According to some systems, however, battery cells may be directly stacked into the battery housing without arranging the battery cells to modules. The spacer frames may be omitted, because the new battery cells experience less swelling. As the cell stacks become longer by stacking the battery cells directly into the battery housing, the thickness tolerances of the battery cell housings become more problematic.

Therefore, some embodiments may include a spacer that allows for a relatively efficient compensation of thickness tolerances between the battery cell housings and the thickness of a battery cell stack.

Some embodiments of the present invention may include a battery cell stack spacer allowing for an efficient compensation of thickness tolerances between the battery cell housings and the thickness of a battery cell stack.

In the present example embodiment, a battery cell may be a prismatic battery cell, but embodiments are not restricted thereto.

Figure 2:
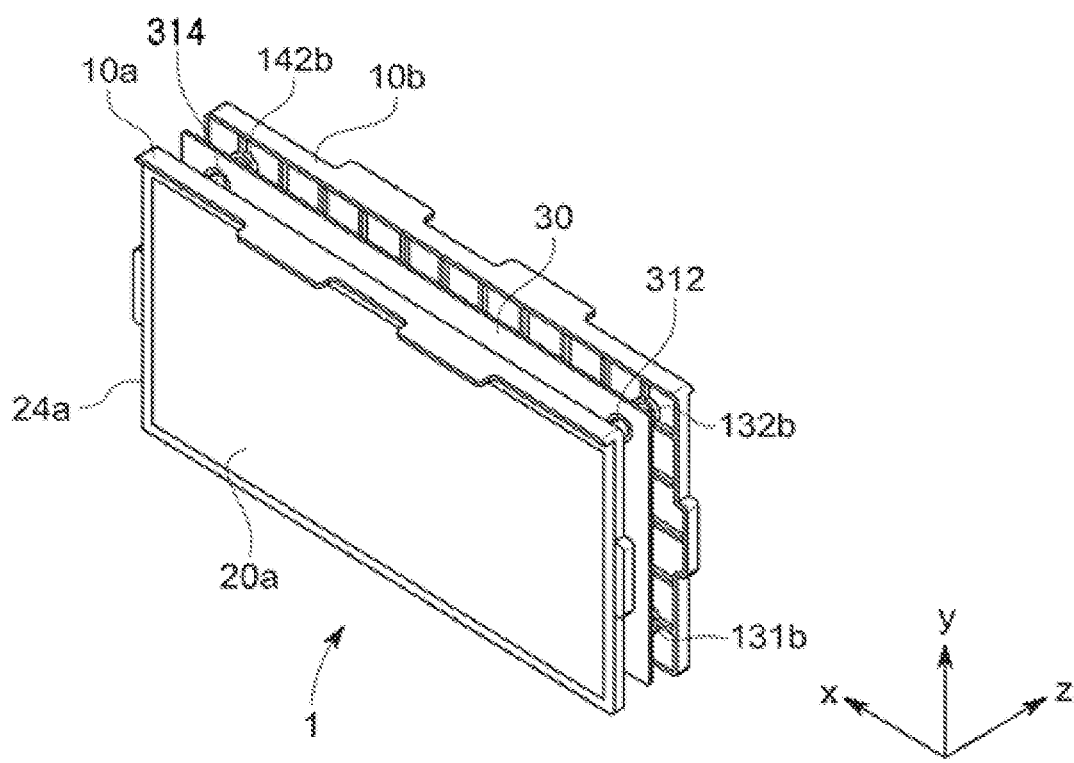
FIG. 2 illustrates a schematic perspective view of the same battery cell stack spacer in a non-assembled state, i.e., as exploded assembly drawing.

FIG. 1 is a perspective view illustrating a battery cell stack spacer 1 according to some embodiments of the invention in an assembled state, wherein FIG. 2 shows a perspective view of the same battery cell stack spacer 1 in a non-assembled state (i.e., as exploded assembly drawing).

To facilitate the description, a cartesian coordinate system with the axes x, y, and z are also shown in the figures.

The battery cell stack spacer depicted in FIGS. 1 and 2 comprises two flat carrier members, for example, a first carrier member 10a and a second carrier member 10b, which exhibit an identical (or similar) shape being described in more detail below. The first carrier member 10a and the second carrier member 10b face each other with a respective flat side extending parallel to the x-y-plane of the coordinate system. However, sandwiched between the two carrier members 10a, 10b is a thin tolerance compensation sheet 30. The planar extension (i.e., the flat sides) of the tolerance compensation sheet 30 is congruent to the flat sides of the carrier members 10a, 10b facing the tolerance compensation sheet 30. Also, the tolerance compensation sheet 30 extents parallel to the flat sides of the carrier members 10a, 10b facing the tolerance compensation sheet 30, i.e., the tolerance compensation sheet 30 extents parallel to the x-y-plane of the coordinate system.

In the assembled state depicted in FIG. 1, the flat sides of the carrier members 10a, 10b each abut, over their whole extension, to the tolerance compensation sheet 30 which their respective flat side facing the tolerance compensation sheet 30 such that the tolerance compensation sheet 30 is completely clamped between the two carrier members 10a, 10b. In other words, there is no space left between the tolerance compensation sheet 30 and each of the carrier members 10a, 10b, when viewing along the z-direction. Accordingly, only the thin edges of the tolerance compensation sheet 30 are visible, which extends along the upper edge of the shown battery cell stack spacer 1 along the x-direction and the front edge of which in the y-direction with reference to the coordinate system.

According to some embodiments, each of the flat carrier members 10a, 10b and the tolerance compensation sheet 30 have an essentially rectangular shape. In each of the corners of the tolerance compensation sheet 30, a hole is provided (see also FIG. 9 and the corresponding detailed description thereof below). As the tolerance compensation sheet 30 is partly hidden behind the first carrier member 10a in the exploded view of FIG. 2, only the holes 312, 313 near the two upper corners of the tolerance compensation sheet 30 are visible in the figure.

Figure 3:
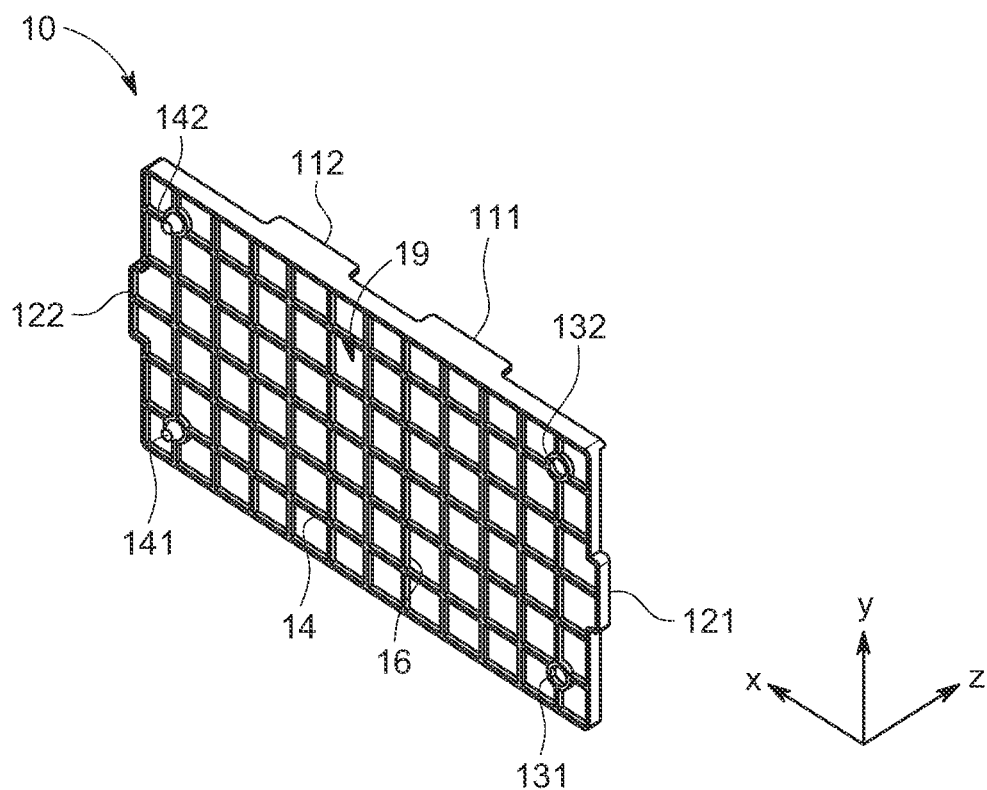
FIG. 3 illustrates a perspective view of a perspective view of a carrier member.
Figure 6:
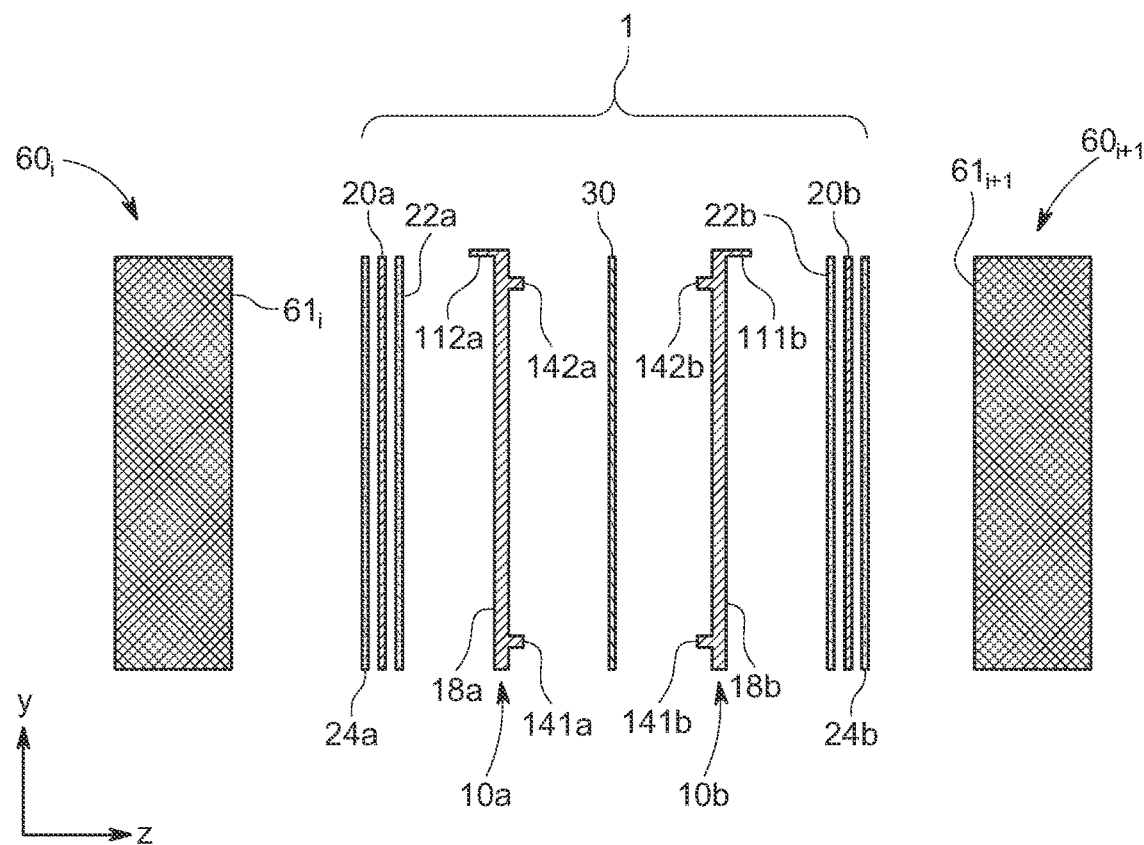
FIG. 6 shows a schematic exploded side view of the battery cell stack spacer shown in FIGS. 1 and 2.

On the first carrier member 10a, tapered bolts 141a, 142a project from the flat side of the first carrier member 10a facing the tolerance compensation sheet 30 at positions corresponding (with regard to the x- and the y-direction) to the positions of holes 311, 312 at the nearer corners (with reference to FIG. 2, i.e., the two corners being closer to the y-axis of the depicted coordinate system) in the tolerance compensation sheet 30 (see also FIGS. 3 and 6). In an assembled state, these bolts 141a, 142a penetrate through the respective holes 311, 312 of the tolerance compensation sheet 30 and touch the flat side of the second carrier member 10b facing the tolerance compensation sheet 30.

In a corresponding manner, tapered bolts 141b, 142b project from the flat side of the second carrier member 10b facing the tolerance compensation sheet 30 at positions corresponding (with regard to the x- and the y-direction) to the positions of holes 313, 314 at the rearmost corners (with reference to FIG. 2, i.e., the two corners being farther away from the y-axis of the depicted coordinate system) in the tolerance compensation sheet 30 (see also FIGS. 3 and 6). Again, in an assembled state, these bolts 141b, 142b penetrate through the respective holes 313, 314 of the tolerance compensation sheet 30 and touch the flat side of the first carrier member 10a facing the tolerance compensation sheet 30.

The bolts 141a, 142a, 141b, 142b hold the tolerance compensation sheet 30 such that it remains in its position extended over the whole area of the flat sides of the carrier members 10a, 10b facing the tolerance compensation sheet 30. Any folding, crumpling, or wrinkling of the tolerance compensation sheet 30 is hence prohibited.

To avoid any small gaps between the bolts 141a, 142a of the carrier member 10a and the flat side of the second carrier member 10b, the latter comprises recesses or depressions 131b, 132b in its flat side facing the tolerance compensation sheet 30. These flat recesses or depressions 131b, 132b are arranged at positions that correspond, with regard to the x- and the y-direction, to the positions to the bolts 141a, 142a on the first carrier member 10a.

In a corresponding manner, but not visible in FIG. 2, the first carrier member 10a comprises recesses or depressions in its flat side facing the tolerance compensation sheet 30. These flat recesses or depressions are arranged at positions that correspond, with regard to the x- and the y-direction, to the positions to the bolts 141b, 142b on the second carrier member 10b.

This way, the bolts penetrating each through a hole of the tolerance compensating sheet 30 engage each with a corresponding recess or depression of the respective opposite carrier member such that slipping of the tolerance compensating sheet 30 through a gap between bolt and opposite carrier member is avoided.

Due to the above-described arrangement of holes in the tolerance compensation sheet 30 and bolts (and recesses/depressions) on the carrier members 10a, 10b, the first carrier member 10a and the second carrier member 10b may have a completely identical (or similar) shape, as a rotation of 180° of the first carrier member 10a as shown in FIG. 2 around the y-axis would be an exact (translated or mirror image) copy of the second carrier member 10b. For example, the positions of the bolts 141a, 142a of the first carrier member 10a would—after this rotation and a respective translation—appear at the positions of the bolts 141b, 142b of the second carrier member 10b as depicted in FIG. 2. This applies in a similar fashion to the recesses or depressions of the first carrier member 10a, the positions of which would be transformed into the positions of the recesses or depressions 131b, 132b of the second carrier member 10b. Accordingly, the shown embodiment of the battery cell stack spacer 1 has the advantage that only a single shape of carrier members is required to be manufactured, which is suitable likewise for the first carrier member 10a as well as for the second carrier member 10b. In other words, the first and second carrier members 10a, 10b in the depicted embodiment may be swapped. Thus, while assembling the battery cell stack spacer 1, there is no need to pay attention whether a carrier member is suitable as a first or as a second carrier member, which simplifies the assembly of the battery cell stack spacer 1.

Instead of a single tolerance compensation sheet 30, several tolerance compensation sheets may be sandwiched between the carrier members 10a, 10b. Then, each of the several tolerance compensation sheets may have the same shape. For example, according to some embodiments that use bolts to hold the tolerance compensation sheets, the holes must be arranged at identical positions on the plane of these tolerance compensation sheets, wherein these positions correspond to positions of bolts (and/or recesses/depressions) arranged on the flat sides of the carrier members. Then, when the plurality of tolerance compensation sheets is sandwiched between the carrier members, each of the bolts penetrates each of the several tolerance compensation sheet through a hole arranged at a respective position and finally reaches to the opposite carrier member (or engages with a recess/depression at a respective position on the opposite carrier member). The use of more than one tolerance compensation sheet is further explained below in the context of FIG. 7.

Furthermore, a first thermally insulating layer 20a is deposited over the complete extension of the flat side 18a (see also FIG. 6) of the first carrier member 10a opposite to its flat side facing the tolerance compensation sheet 30. Equipped with the first thermally insulating layer 20a, the embodiment of the battery cell stack spacer 1 shown in FIGS. 1 and 2 provides a thermal barrier between two battery cells being arranged adjacent (in the z-direction; see also FIGS. 6 and 10) to the battery cell stack spacer 1, i.e., between which the battery cell stack spacer 1 is sandwiched.

The first thermally insulating layer 20a may be glued to the flat side 18a of the first carrier member 10a provided for facing a battery cell in of a battery cell stack (see FIG. 10), i.e., the flat side 18a of the first carrier member 10a opposite to the side facing the tolerance compensation sheet 30.

In a corresponding manner and having a corresponding technical function, a second thermally insulating layer 20b may be deposited over the complete extension of the flat side 18b (see also FIG. 6) of the second carrier member 10b opposite to its flat side facing the tolerance compensation sheet 30.

Figure 4:
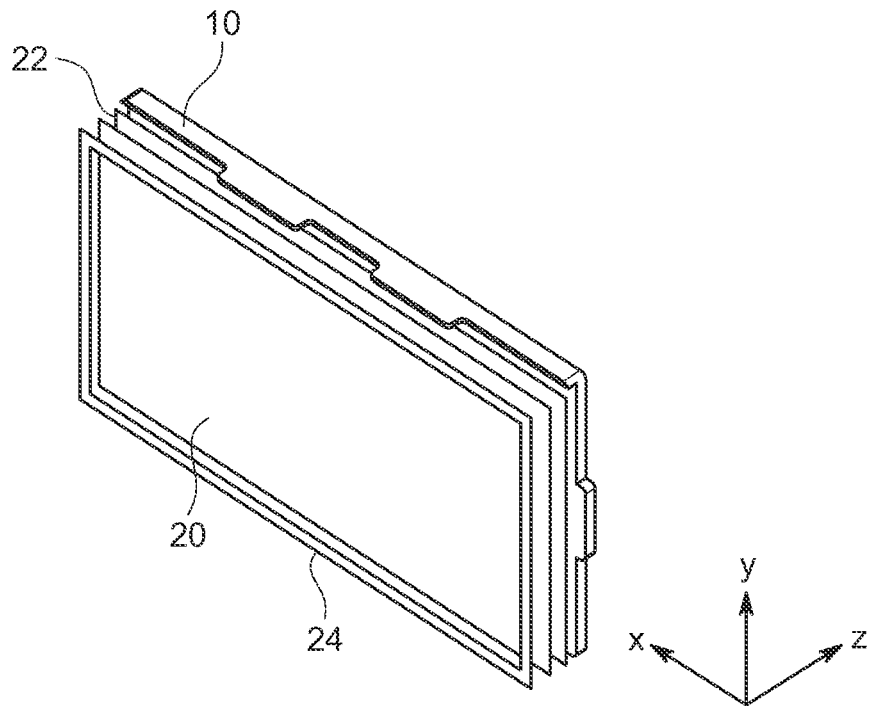
FIG. 4 shows a perspective exploded view of the carrier member of FIG. 3.

The deposition of the thermally insulating layer on a carrier member will be described in more detail below in the context of FIGS. 4, 5, and 8.

FIG. 3 shows a perspective view of a carrier member 10, which may be employed in the battery cell stack spacer according to some embodiments of the invention, and for example in the battery cell stack spacer 1 as shown in FIGS. 1 and 2. As already pointed out above, the first and second carrier member 10a, 10b of the embodiment of the battery cell stack spacer 1 shown in FIGS. 1 and 2 are identically shaped such that the carrier member 10 shown in FIG. 3 may be employed as the first carrier member 10a or just as well as the second carrier member 10b. Hence, any reference to the use as a "first" or "second" carrier member will be omitted in the following description. Again, reference is made to a cartesian coordinate system likewise depicted in FIG. 3.

Carrier member 10 is a flat rectangular body extending, in FIG. 3, in the x-y-plane of the coordinate system. The rectangular shape is in particular suitable for use with a stack of prismatic battery cells having each a base side exhibiting a likewise rectangular shape, i.e., a shape congruent to the expansion of carrier member 10 in the x-y-plane. Visible in FIG. 3 is the flat side of carrier member 10 being adapted to face the tolerance compensation sheet 30 (see FIGS. 1 and 2), whereas the opposite flat side adapted to support an adjacent battery cell is not visible in the figure.

To facilitate the assembly of the battery cell stack spacer 1 as shown in FIGS. 1 and 2, the carrier member 10 may comprise tabs 111, 112, 121, 122, arranged along all or some of the edges of the rectangular body of carrier member 10. In particular, the lateral edges of the carrier member 10 (i.e., its edges extending along the y-direction), may comprise outwardly (i.e., directed in or against the x-direction) extending tabs 121, 122 that provide a support or hold that can be gripped manually or by a machine during assembly (or destruction) of the battery cell stack spacer as well as during insertion of the battery cell stack spacer 1 into a stack of battery cells 60 (or removing the battery cell stack spacer 1 therefrom); see also FIG. 10.

Further, the carrier member 10 may comprise forwardly (i.e., directed in the z-direction) extending tabs 111, 112 arranged on the upper edge of carrier member 10. These tabs 111, 112 may on the one hand—similar to the outwardly extending tabs 121, 122 described above—provide a hold or support during the process of assembling the battery cell stack spacer 1. On the other hand, however, the forwardly extending tabs 111, 112 may also provide a support or act as a guide for a battery cell that should be arranged (e. g., glued; see below) at the carrier member's flat side facing into the z-direction. Corresponding forwardly extending tabs may also be arranged on the lower edge of carrier member 10.

To increase the mechanical stability of the carrier member 10, one or more cross struts 14 extending horizontally (i.e., along the x-direction) as well as one or more cross struts 16 extending vertically over the carrier member's flat side facing against the z-direction may be provided. To provide further stabilization to the carrier member 10, corresponding or similar horizontal and/or vertical cross struts may also be arranged on the carrier member's flat side facing into the z-direction.

In the rear corners of carrier member 10 (with reference to FIG. 3, i.e., in the two corners being farther away from the y-axis of the depicted coordinate system), bolts 141, 142 are projecting from the visible flat side of carrier member 10. In the nearer corners of carrier member 10 (with reference to FIG. 3, i.e., in the two corners being closer to the y-axis of the depicted coordinate system), recesses or depressions 131, 132 are notched into the visible flat side of carrier member 10. The function of both, bolts 141, 142 and recesses or depressions 131, 132 has already been described above with reference to FIGS. 1, 2, and 6, wherein, of course, bolts 141a and 142a correspond to bolts 141 and 142 of FIG. 3, and recesses or depressions 131b and 132b correspond to recesses or depressions 131 and 132 of FIG. 3.

As shown in FIG. 3, the bolts 141, 142 may be tapered. Here, the bolts 141, 142 comprise each a pedestal being arranged at the crossing point of the respective horizontal cross strut and vertical cross strut adjacent to the edges of carrier member 10 that form, at their intersection point, the respective corner of carrier member 10. Each bolt 141, 142 may comprise a projection that is arranged on the pedestal and exhibits a narrower diameter than the pedestal. According to some embodiments, the relative distances of the bolts 141, 142 as well as of the depressions 131, 132 with respect to the respective adjacent edges of carrier member 10 are equal to each other to provide symmetry of these positions with respect to the vertical and horizontal center axis of the visible flat side of carrier member 10. These positions correspond to the positions of the holes arranged in the tolerance compensation sheet 30, which are described in more detail below in the context of FIG. 9.

As further shown in FIG. 3, the recesses or depressions 131, 132 may be formed by an annular wall formed on the visible flat side of carrier member 10. The diameter measured with regard to the inner sides of this annular wall corresponds to (or, in order to avoid misfit, is slightly larger than) the diameter of the above-described projections of bolts 141, 142. Then, the projections of a further example of carrier member 10 can engage with the recesses or depressions 131, 132, as described above in the context of FIGS. 1 and 2.

According to some embodiments, the battery cell stack spacer may include thermally insulating layers arranged on the carrier members. Accordingly, the disposition of a thermally insulating layers on a carrier member is explained in the following with the help of FIGS. 4 and 5. FIG. 4 shows a perspective exploded view of carrier member 10 of FIG. 3, layers of glue 22, 24, and a thermally insulating layer 20 to be disposed on the carrier member 10. FIG. 5 shows the same arrangement of components in an assembled state. Again, a cartesian coordinate system is provided in these figures to facilitate description. In comparison to FIG. 3, carrier member 10 is rotated by 180° around the y-axis of the coordinate system (and shifted in space) such that the visible flat side of carrier member 10 is the flat side configured for support of adjacent battery cells, when the battery cell stack spacer 1 comprising carrier member 10 is inserted into a battery cell stack as described below with reference to FIG. 10.

Figure 10:
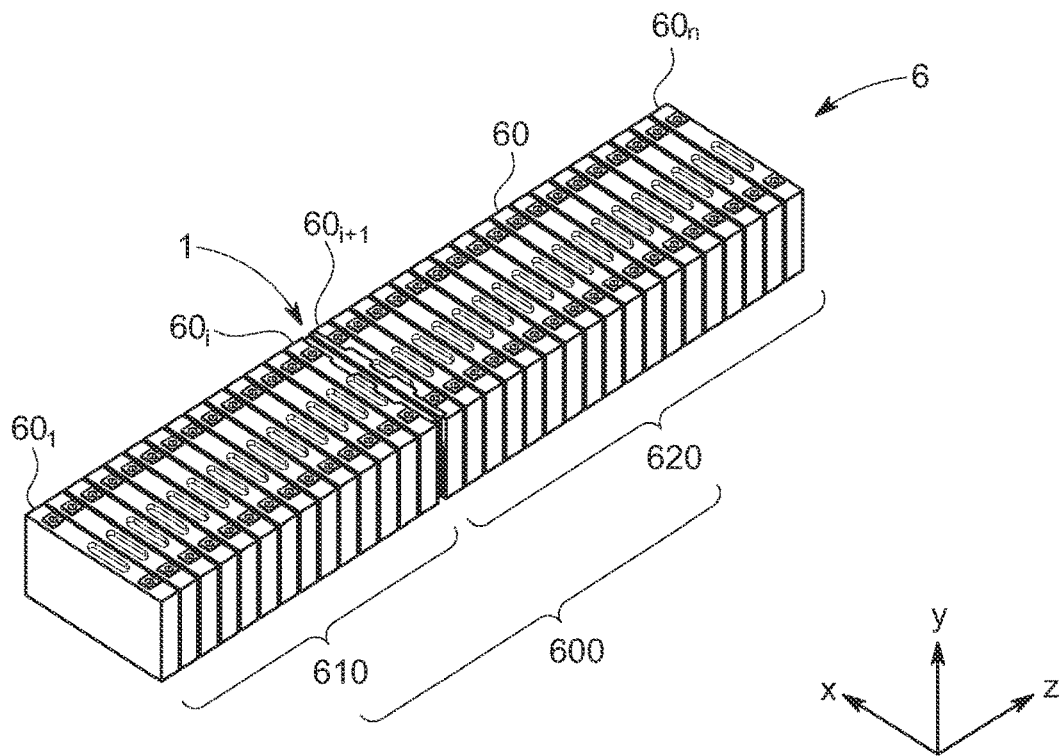
FIG. 10 shows, in a perspective view, a stack with a plurality of battery cells and an embodiment of a battery cell stack spacer according to the invention.

Thermally insulating layer 20 may extend over the complete expansion of the flat side of carrier member 10 being adapted to support an adjacent battery cell. Thus, it provides a thermal insulation between the further components of the battery cell stack spacer 1 and the battery cells abutting the battery cell stack spacer 1 as depicted in FIG. 10. According to some embodiments, the thermally insulating layer 20 may be made of a material or at least comprises a material having a lower heat conductivity and/or a higher temperature resistance than the material of the carrier member 10. An example for the material of the thermally insulating layers is selected from one of an inorganic paper or a composite comprising aramid or ceramics. Hence, these further components of the battery cell stack spacer 1 (such as the carrier members and the one or more tolerance compensation sheets 30) are thermally shielded by the thermally Insulating layer 20.

Furthermore, the thermally insulating layer 20 may be made of a material or at least comprise a material being electrically insulating. In this case, the thermally insulating layer 20 provides for both thermal and electrical insulation.

Figure 5:
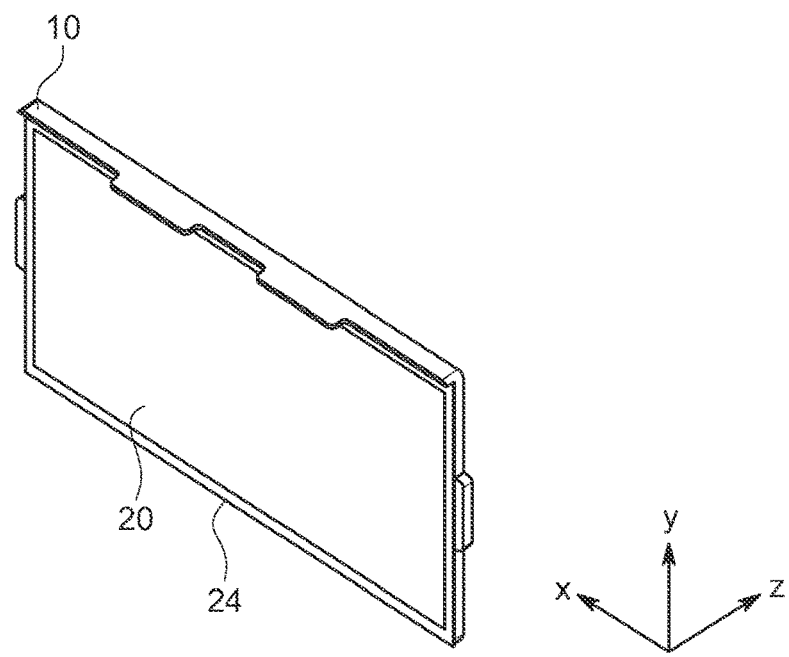
FIG. 5 illustrates a schematic perspective view of the carrier member of FIG. 3.

In the embodiment depicted in FIGS. 5 and 6, the thermally insulating layer 20 is glued onto the visible flat side of carrier member 10. To that end, a first layer of glue 22 is provided between the thermally insulating layer 20 and the carrier member 10. The glue may not be provided over the whole expansion of the thermally insulating layer 20. It suffices that glue is provided in stripes adjacent to each of the four edges of the thermally insulating layer 20. This is described in more detail below in the context of FIG. 8. The glue may be deposited, before assembling the battery cell stack spacer 1, on the flat side of the carrier member 10 facing against the z-direction in FIG. 4 or may be deposited on the thermally insulating layer 20. After that, the thermally insulating layer 20 and the carrier member 10 may be assembled as shown in FIG. 5. The glue can be a viscous material or may be provided on both sides of a thin sheet of suitable material, which is sandwiched between the carrier member 10 and the thermally insulating layer 20, while assembling the latter to the state as shown in FIG. 5.

Also, glue may be provided also on the opposite side of the thermally insulating layer 20, i.e., the side adapted to come into direct contact with a battery cell, when the battery cell stack spacer 1 is used in a battery cell stack as depicted in FIG. 10. To that end, a further layer of glue 24 may be provided on the side of the thermally insulating layer 20 facing against the z-direction of the coordinate system. The further layer of glue 24 provides for a stable mechanical connection between the battery cell stack spacer 1 and a battery cell arranged next to the battery cell stack spacer 1. The also the further layer of glue 24 may not be provided over the whole expansion of the thermally insulating layer 20. It suffices that glue is provided in stripes adjacent to each of the four edges of the thermally insulating layer 20. This is described in more detail below in the context of FIG. 8. Also the glue of the further layer of glue 24 may be a viscose material or may be provided on both sides of a (further) thin sheet of suitable material, which is sandwiched between the thermally insulating layer 20 and an adjacent battery cell, when the battery cell stack spacer 1 comprising the assembly as depicted in FIGS. 4 and 5 is used within a battery cell stack as shown in FIG. 10.

FIG. 6 shows a schematic exploded side view of the battery cell stack spacer 1 shown in FIGS. 1 and 2 when sandwiched between two battery cells $60_i$, $60_{i+1}$ (the battery cells $60_i$, $60_{i+1}$ not being part of the battery cell stack spacer 1) abutting the battery cell stack spacer 1 from both sides. The directions of axes y and z of the (2-dimensional) coordinate system depicted in FIG. 6 are consistent with directions of the axes y and z of the (3-dimensional) coordinate system of FIGS. 1 and 2. FIG. 6 shows the symmetric assembly of the embodiment of the battery cell stack spacer 1 as described above. Apart from the tolerance compensation sheet 30, each component of the battery cell stack spacer 1 is comprised pairwise in the assembly.

Tolerance compensation sheet 30 is sandwiched between a pair of carrier members, viz. the first carrier member 10a and the second carrier member 10b such that the flat sides of each of the carrier members 10a, 10b facing the tolerance compensation sheet 30 are completely covered by the latter. Two bolts 141a, 142a project from the first carrier member 10a in the direction of the second carrier member 10b. Additionally, two further bolts 141b, 142b project from the second carrier member 10b into the direction of first carrier member 10a. In an assembled state, these bolts would penetrate through respective holes in the tolerance compensation sheet 30 as described above. Note that the bolts 141a, 142a of the first carrier member 10a and the bolts 141b, 142b of the second carrier member 10b are not positioned opposite to each. With respect to the x-direction (which is the direction perpendicular to the drawing plane of FIG. 6) the bolts 141a, 142a of the first carrier member 10a are arranged in front of the bolts 141b, 142b of the second carrier member 10b, or in other words, when viewing FIG. 6, the bolts 141a, 142a of the first carrier member 10a are closer to the viewer's eyes than the bolts 141b, 142b of the second carrier member 10b. The recesses or depressions 131b, 132b shown in the perspective exploded view of FIG. 2 are not visible in FIG. 6, as they are covered by the edges of carrier member 10b. The same applies for recesses or depressions arranged on the flat side of carrier member 10a facing tolerance compensation sheet 30.

Above the upper edges of thermal insulating layers 20a, 20b, tab 112a of first carrier member 10a and tab 111b of second carrier member 10b each extend opposite to or, respectively, along the direction of the z-axis.

A first thermal insulating layer 20a is provided adjacent to the flat side 18a of first carrier member 10a, which is opposite to the flat side of first carrier member 10a facing the tolerance compensation sheet 30. To fix the first thermal insulating member 20a on the first carrier member 10a, a first layer of glue 22a is provided between the thermal insulating layer 20a and the first carrier member 10a. Further, to fix the battery cell stack spacer 1 with its first thermal insulating layer 20a to an adjacent battery cell $60_i$ (left in FIG. 6) when the battery cell stack spacer 1 is used within a stack of battery cells as depicted in FIG. 10, a further layer of glue 24a is provided on the flat side of the first thermal insulating layer 20a that faces the adjacent battery cell $60_i$.

Due to the symmetry of the assembly of battery cell stack spacer 1, the arrangement of its components on the opposite side with respect to the tolerance compensation sheet 30 is ordered in a corresponding (but of course inversed with respect to the z-axis) manner. This refers to the components of the second carrier member 10b, a second thermal insulating layer 20b and layers of glue 22b, 24b. Thus, the battery cell stack spacer 1 may abut a further battery cell $60_{i+1}$ (right in FIG. 6) and be fixed to the latter, when the battery cell stack spacer 1 is used within a stack of battery cells as depicted in FIG. 10.

As shown in FIG. 6, according to some embodiments of the battery cell stack spacer 1, each of the two carrier members 10a, 10b is equipped with a thermal insulating layer. Then, the components of the battery cell stack spacer 1 between these two thermal insulating layers 20a, 20b are each thermally shielded. Further, the use of two independent thermal insulating layers 20a, 20b being spaced apart in the direction of the alignment of the battery cells of a battery cell stack 6, when the battery cell stack spacer 1 is employed in a battery cell stack 6 as shown in FIG. 10, provides an improved thermal insulation between the two battery cells $60_i$, $60_{i+1}$ next to the battery cell stack spacer 1 and thus, an improved thermal insulation between the two parts of battery cell sub-stacks 610, 620 being separated by the battery cell stack spacer 1 in comparison to the use of only a single thermal insulating layer.

Figure 7:
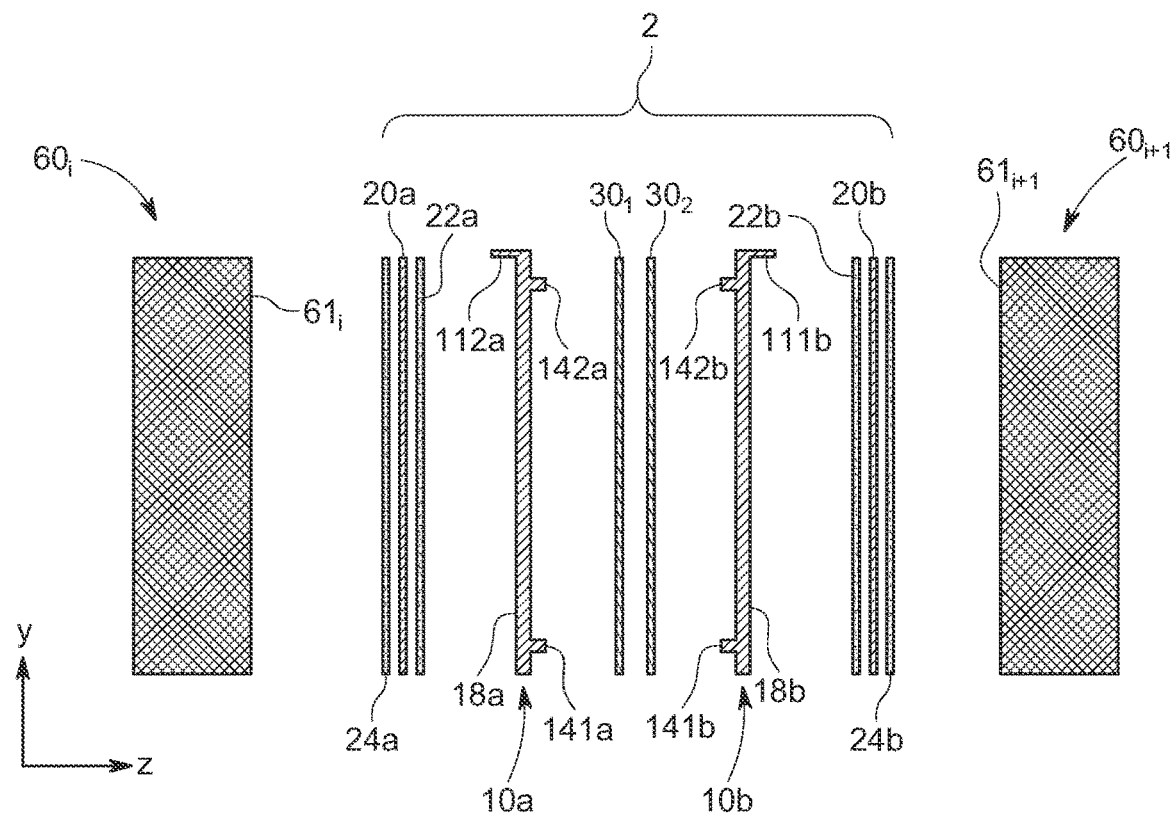
FIG. 7 is a schematic exploded side view of another embodiment of the battery cell stack spacer according to the invention.

FIG. 7 shows a schematic exploded side view of another embodiment of the battery cell stack spacer 2 according to the invention, when sandwiched between two battery cells $60_i$, $60_{i+1}$ (the battery cells $60_i$, $60_{i+1}$ not being part of the battery cell stack spacer 2) abutting the battery cell stack spacer 2 from both sides. The battery cell stack spacer 2 of FIG. 7 is essentially identical to the battery cell stack spacer 1 described in the context of the foregoing figures, in particular of FIG. 6, apart from the feature of the tolerance compensation sheet. Instead of using a single tolerance compensation sheet 30, as in the embodiment of FIG. 6, two tolerance compensation sheets $30_1$, $30_2$ are sandwiched between the first carrier member 10a and the second carrier member 10b in the embodiment of FIG. 7. If, as shown, each of tolerance compensation sheets $30_1$, $30_2$ has the same thickness (measured in the z-direction) as the single tolerance compensation sheet 30 of the embodiment of FIG. 6, the battery cell stack spacer 2 has a larger total thickness in comparison to the battery cell stack spacer 1.

According to some embodiments, not only two tolerance compensation sheets $30_1$, $30_2$ may sandwiched between the first and second carrier members 10a, 10b, but any suitable number of tolerance compensation sheets may be utilized. Also, tolerance compensation sheets of various thicknesses can be used. Thus, it may be possible to easily assemble battery cell stack spacers having a thickness corresponding to an arbitrary thickness value. For example, tolerance compensation sheets each having a thickness of 0.1 mm may be stored. Then, with the use of these tolerance compensation sheets, the thickness of an assembled battery cell stack spacer may be adjusted in steps of 0.1 mm.

Figure 8:
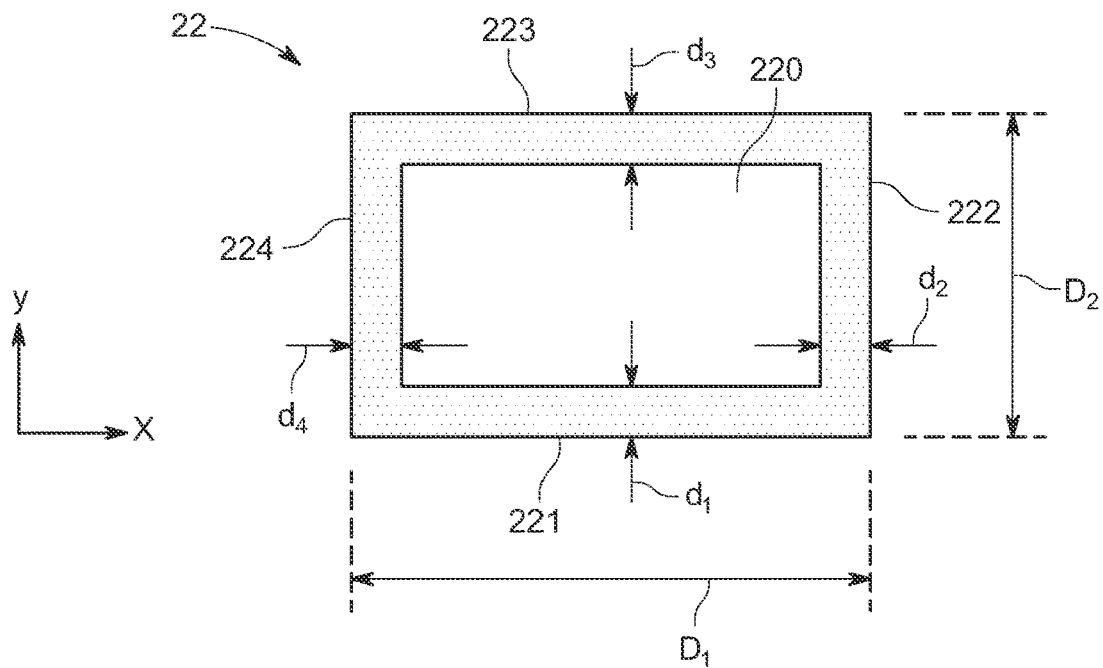
FIG. 8 shows a schematic plan view on a layer of glue.

FIG. 8 shows a schematic plan view on a layer of glue 22 that may be used in embodiments of the battery cell stack spacer to fix a thermal insulation layer 20 to the carrier member 10. The dimensions of the layer of glue 22 (i.e., its width $D_1$ and its height $D_2$) correspond to the dimensions of the thermal insulating layer 20. However, the described shape of a layer of glue is also suitable for the layer of glue 24 to fix the thermal insulation layer 20 to a battery cell when the battery cell stack spacer is implemented into a stack of battery cells. As already described in the context of FIGS. 4 and 5, it suffices that the layer of glue 22 is provided in stripes 221, 222, 223, 224 adjacent to the edges of the thermal insulating layer 20 such that in a center area 220 of the layer, no glue is provided. Accordingly, some embodiments may reduce the amount of glue utilized during the manufacture of the battery cell stack spacer 1.

The outer edge of the body shown in FIG. 8 corresponds to the outer edge of thermal insulating layer 20. In correspondence to FIGS. 4 and 5, the layer of glue extends parallel to the x-y-plane of the coordinate system. As shown in FIG. 8, for each of the four edges, glue is provided in a stripe that reaches directly until the outer edge. The stripes 221, 222, 223, 224 may have thicknesses $d_1$, $d_2$, $d_3$, $d_4$ (measured in the x-y-plane) deviating from each other. However, according to some embodiments, each of the four stripes 221, 222, 223, 224 are of equal thickness, i.e., the relation $d_1 = d_2 = d_3 = d_4$ is fulfilled.

Figure 9:
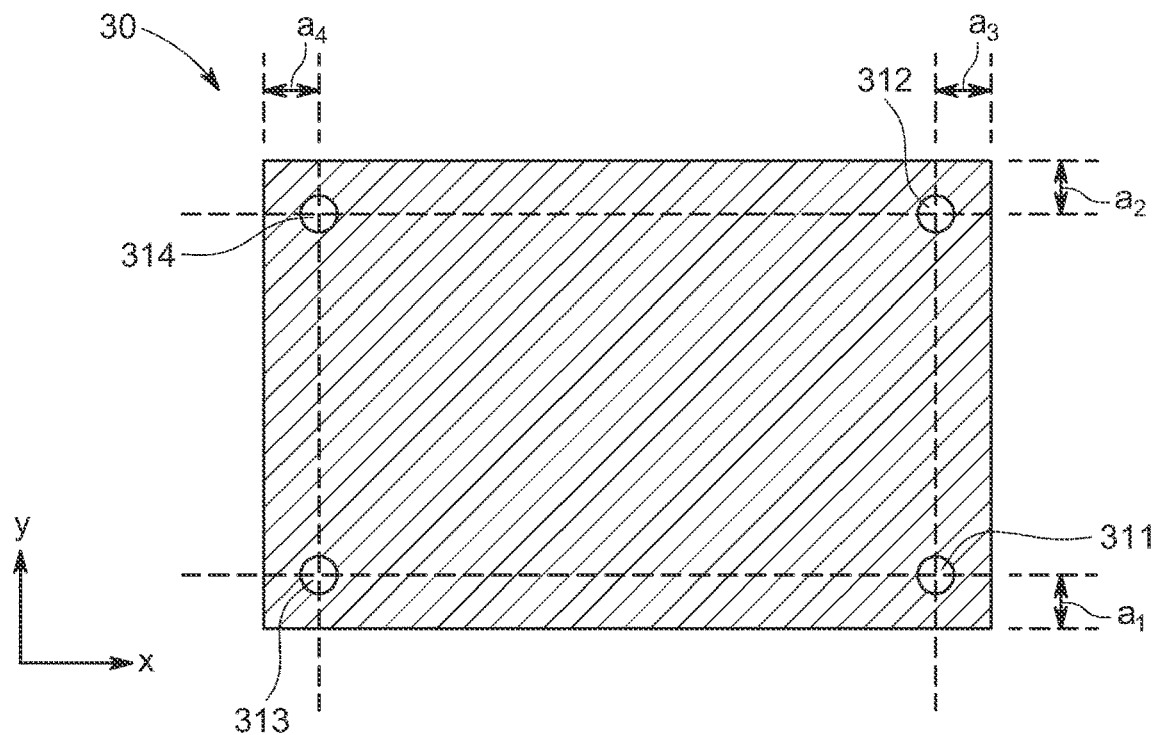
FIG. 9 shows schematically a rectangular tolerance compensation sheet.

FIG. 9 shows schematically the rectangular tolerance compensation sheet 30 of the battery cell stack spacer 1 of FIGS. 1, 2, and 6 in a planer view. The shown body may, however, also describe each of the tolerance compensation sheets $30_1$, $30_2$ of the embodiment of the battery cell stack spacer 2 depicted in FIG. 7. In each of the four corners of the tolerance compensation sheet 30, a hole 311, 312, 313, 314 is provided. Each of the holes is positioned in a certain distance to the respective neighbored edges of the tolerance compensation sheet 30. For example, hole 311 in the right bottom corner has a distance $a_1$ to the bottom edge and a distance $a_3$ to the right edge of tolerance compensation sheet 30 (with respect to the figure). According to some embodiments, these distances may be chosen individually for each hole.

However, according to some embodiments, the distances are chosen to be equal for each hole and to each of the respective neighbored edges of the tolerance compensation sheet 30. Then, as depicted in FIG. 9, the lower holes 311, 313 are positioned in a distance $a_1$ to the lower edge, the upper holes 312, 314 are positioned in a distance $a_2$ to the upper edge, the left holes 313, 314 are positioned in a distance $a_4$ to the left edge, and the right holes 311, 312 are positioned in a distance $a_3$ to the right edge, and it holds the relation $a_1 = a_2 = a_3 = a_4$ for the distances.

FIG. 10 shows, in a perspective view, a battery cell stack 6 with a plurality battery cells 600 (or n battery cells 60), wherein the battery cells 60 are aligned along the z-direction. The battery cell stack 6 is divided into two sub-stacks, a first sub-stack 610 and a second sub-stack 620. The first sub-stack 610 comprises a plurality of i battery cells, ordered from first battery cell $60_1$ to the i-th battery cell $60_i$. The second sub-stack 620 comprises a number of (n−i) battery cells, ordered from a battery cell $60_{i+1}$ to the n-th battery cell $60_n$.

Between the first sub-stack 610 and the second sub-stack 620, an embodiment of the battery cell stack spacer 1 according to the invention is inserted. Thus, the accumulated thickness (measured in the z-direction) of the plurality of battery cells 600 of batteries is enlarged by the thickness of the battery cell stack spacer 1. Hence, if the accumulated thickness of the plurality of battery cells 600 of batteries is smaller than a predefined set-value for the thickness (the latter typically corresponding to an inner dimension of a battery case provided for accommodating the battery cell stack 6), the accumulated thickness of the battery cell stack 6 is enlarged by the insertion of the battery cell stack spacer 1. Accordingly, the battery cell stack spacer 1 provides a tolerance compensation for the accumulated thickness of a battery cell stack 6. Therefore, of course, the thickness of the battery cell stack spacer must be adapted to the thickness deviation of the accumulated thickness of the battery cell stack with regard to the predefined set-value for the thickness.

Furthermore, the battery cell stack spacer 1 provides for a thermal insulation between the first sub-stack 610 and the second sub-stack 620 in the assembled battery cell stack 6. Thus, a thermal event in one of the sub-stacks is prevented to propagate to the other sub-stack, which provides an increase of security in case of thermal events such as thermal runaways and the like.

According to some embodiments, more than a single battery cell stack spacer may be used within the stack of battery cells, dividing the stack into more than two sub-stacks. If each of these battery cell stack spacers is equipped with at least one thermal insulating layer, a thermal event in a certain sub-stack is confined to the relatively unit of the battery cells of this sub-stack.

While aspects of some example embodiments of the invention are described with reference to the attached drawings, it will be understood by those skilled in the art that various changes in form and details may be made therein without departing from the spirit and scope of embodiments according to the present invention as defined by the appended claims and their equivalents.

DESCRIPTION OF SOME OF THE REFERENCE SYMBOLS

1, 2 battery cell stack spacer
6 stack of battery cells
10, 10*a*, 10*b* carrier members
20, 20*a*, 20*b* thermal insulating layers
22, 22*a*, 22*b* layers of glue
24, 24*a*, 24*b* layers of glue
30, 30$_1$, 30$_2$ tolerance compensation sheets
60 battery cell
60$_1$ first battery cell in a stack of battery cells
60$_i$ last battery cell of a first sub-stack
60$_{i+1}$ first battery cell in a second sub-stack
60$_n$ last battery cell in a stack of battery cells
111, 112 forwardly extending tabs
121, 122 outwardly extending tabs
131, 132 recesses or depressions
131*b*, 132*b* recesses or depressions
141, 142 bolts
141*a*, 141*b* bolts
142*a*, 142*b* bolts
220 center area of a layer of glue
221, 222, 223, 224 stripes of glue
311, 312, 313, 314 holes in tolerance compensation sheet
600 plurality of battery cells
610, 620 sub-stacks of battery cells
$a_1$, $a_2$, $a_3$, $a_4$ distances of holes in the tolerance compensation sheet to edges
$d_1$, $d_2$, $d_3$, $d_4$ thickness of stripes of glue
$D_1$, $D_2$ length of edges of a layer of glue
x, y, z axes of a cartesian coordinate system

What is claimed is:

1. A battery cell stack spacer compensating a thickness deviation of a stack of battery cells aligned along a first direction, the battery cell stack spacer comprising:

a first carrier member elongated along a second direction and a third direction, with a plane defined by the second direction and the third direction being perpendicular to the first direction, the first carrier member providing planar support to a base side of a first battery cell, the first carrier member comprising a first tab extending in the first direction;

a second carrier member elongated along the second direction and the third direction, the second carrier member providing planar support to a base side of a second battery cell, the second carrier member comprising a second tab extending in a fourth direction opposite the first direction; and one or more tolerance compensation sheets sandwiched between the first carrier member and the second carrier member wherein the one or more tolerance compensation sheets each comprise one or more holes; and wherein the first carrier member comprises one or more bolts, the bolts being arranged on the first carrier member such that each bolt projecting from the first carrier member penetrates, for each of the one or more tolerance compensation sheets, through one of the holes in the one or more tolerance compensation sheets.

2. The battery cell stack spacer of claim 1, wherein at least one of the one or more tolerance compensation sheets has a lower rigidity than each of the first and second carrier members.

3. The battery cell stack spacer of claim 1, wherein at least one of the one or more tolerance compensation sheets comprises polyethylene terephthalate (PET).

4. The battery cell stack spacer of claim 1, wherein a side of the first carrier member facing the one or more tolerance compensation sheets, sides of each of the one or more tolerance compensation sheets, and a side of the second carrier member facing the one or more tolerance compensation sheets are congruent to each other and are assembled form-fitting in the stack of battery cells.

5. The battery cell stack spacer of claim 1, wherein the second carrier member comprises one or more bolts on the second carrier member such that each bolt projecting from the second carrier member penetrates, for each of the one or more tolerance compensation sheets, through one of the holes in the one or more tolerance compensation sheets.

6. The battery cell stack spacer of claim 5, wherein for each bolt arranged on the first carrier member or the second carrier member, a recess or depression is formed in the respective opposite carrier member at a position opposite to the bolt.

7. The battery cell stack spacer of claim 6,
wherein each of the one or more tolerance compensation sheets has a rectangular shape;
wherein each of the tolerance compensation sheets has four holes, each of the holes being placed in a corner of the respective tolerance compensation sheet; and
wherein each of the bolts and/or each of the recesses or depressions is on the respective carrier member at a position corresponding to one of the four holes of the tolerance compensation sheets being sandwiched between the first and second carrier members.

8. The battery cell stack spacer of claim 1, further comprising:
a first thermal insulating layer on a side of the first carrier member opposite the one or more tolerance compensation sheets.

9. The battery cell stack spacer of claim 8, further comprising:

a second thermal insulating layer on a side of the second carrier member opposite the one or more tolerance compensation sheets.

10. The battery cell stack spacer of claim 9, wherein at least one of the thermal insulating layers has a lower heat conductivity and/or a higher temperature resistance than the carrier member the at least one of the thermal insulating layers is on.

11. The battery cell stack spacer of claim 9, wherein at least one of the thermal insulating layers is an electrical insulator.

12. A battery comprising a battery cell stack, wherein the battery cell stack comprises a plurality of battery cells and at least one battery cell stack spacer according to claim 1.

13. A vehicle comprising the battery of claim 12.

14. A method of assembling a battery cell stack, the battery cell stack comprising a plurality of battery cells and a battery cell stack spacer of claim 1, the method comprising:

determining the thickness deviation of the battery cell stack from a predefined set-value, the predefined set-value being larger than the thickness of the battery cell stack;

assembling the battery cell stack spacer such that the thickness of the battery cell stack spacer corresponds to the thickness deviation;

selecting a first sub-stack of aligned battery cells and a second sub-stack of aligned battery cells, the first sub-stack either comprising zero battery cells, or comprising, counted from one end of the battery cell stack, only the first battery cell or each battery cell from the first battery cell to a further battery cell behind the first battery cell, the second sub-stack comprising each of the remaining battery cells; and inserting the battery cell stack spacer between the first sub-stack of aligned battery cells and the second sub-stack of aligned battery cells.

* * * * *